US012614848B2

(12) United States Patent
Zhang et al.

(10) Patent No.: US 12,614,848 B2
(45) Date of Patent: Apr. 28, 2026

(54) RADIATING ELEMENT AND BASE STATION ANTENNA

(71) Applicant: Outdoor Wireless Networks LLC, Claremont, NC (US)

(72) Inventors: Ting Zhang, Suzhou (CN); Fangwen Wan, Suzhou (CN); Changfu Chen, Suzhou (CN)

(73) Assignee: Outdoor Wireless Networks LLC, Richardson, TX (US)

( * ) Notice: Subject to any disclaimer, the term of this patent is extended or adjusted under 35 U.S.C. 154(b) by 117 days.

(21) Appl. No.: 18/355,519

(22) Filed: Jul. 20, 2023

(65) Prior Publication Data

US 2024/0039159 A1 Feb. 1, 2024

(30) Foreign Application Priority Data

Jul. 29, 2022 (CN) ........................ 202210904703.1

(51) Int. Cl.
*H01Q 5/49* (2015.01)
*H01Q 5/392* (2015.01)

(52) U.S. Cl.
CPC ............... *H01Q 5/49* (2015.01); *H01Q 5/392* (2015.01)

(58) Field of Classification Search
CPC .......... H01Q 5/49; H01Q 5/392; H01Q 1/246; H01Q 1/521; H01Q 5/385; H01Q 5/42; H01Q 21/26; H01Q 1/36; H01Q 1/52
See application file for complete search history.

(56) References Cited

U.S. PATENT DOCUMENTS

2016/0365645 A1* 12/2016 Bisiules ................. H01Q 1/523
2018/0323513 A1* 11/2018 Varnoosfaderani .......................... H01Q 21/062
2020/0044365 A1* 2/2020 Song ...................... H01Q 5/392
2020/0083613 A1* 3/2020 Liu ........................ H01Q 21/24
(Continued)

FOREIGN PATENT DOCUMENTS

CN 208862156 * 5/2019
CN 208862156 U * 5/2019 ............. H01Q 1/246

OTHER PUBLICATIONS

"Extended European Search Report dated Dec. 15, 2020, issued in corresponding European Application No. 23188082.4, 19 pages".

*Primary Examiner* — Dimary S Lopez Cruz
*Assistant Examiner* — Anna N Hamadyk
(74) *Attorney, Agent, or Firm* — Myers Bigel, P.A.

(57) ABSTRACT

The present disclosure relates to a radiating element, which includes: a dipole arm configured to emit first electromagnetic radiation within a pre-determined first operating frequency band; and a parasitic radiator, configured such that a first induced current induced on the parasitic radiator within a second operating frequency band at least partially cancels a second induced current induced on the dipole arm within the second operating frequency band. In addition, the present disclosure relates to a base station antenna, including: a first radiating element array, configured to emit first electromagnetic radiation within a pre-determined first operating frequency band, and at least a part of first radiating elements in the first radiating element array is constructed as radiating elements according to the present disclosure; a second radiating element array, configured to emit second electromagnetic radiation within a pre-determined second operating frequency band.

17 Claims, 7 Drawing Sheets

(56) References Cited

U.S. PATENT DOCUMENTS

| | | | | |
|---|---|---|---|---|
| 2021/0305722 | A1 | 9/2021 | Zhang et al. | |
| 2021/0320409 | A1* | 10/2021 | Luo | H01Q 21/30 |
| 2023/0299491 | A1* | 9/2023 | Harel | H01Q 13/18<br>343/702 |

* cited by examiner

20

20

20

20

20''

20'

RADIATING ELEMENT AND BASE STATION ANTENNA

CROSS-REFERENCE TO RELATED APPLICATION

The present application claims the benefit of priority to Chinese Patent Application No. 202210904703.1, filed on Jul. 29, 2022, with the China National Intellectual Property Administration, and the entire contents of the above-identified application are incorporated by reference as if set forth herein.

TECHNICAL FIELD

The present disclosure generally relates to radio communications and more particularly, to a radiating element and a related base station antenna.

BACKGROUND

Cellular communications systems are well known in the art. In a cellular communications system, a geographic area is divided into a series of sections that are referred to as "cells" which are served by respective base stations. The base station may include one or more base station antennas that are configured to provide two-way radio frequency ("RF") communications with mobile subscribers that are within the cell served by the base station.

In many cases, each base station is divided into "sectors." In the most common configuration, a hexagonally shaped cell is divided into three 120° sectors, and each sector is served by one or more base station antennas that produce a radiation pattern or an "antenna beam" with an azimuth half power beam width (HPBW) of approximately 65°. Typically, the base station antennas are mounted on a tower structure, with the antenna beams that are generated by the base station antennas directed outwardly. Base station antennas are often realized as linear or planar phased arrays of radiating elements.

In order to accommodate the ever-increasing volumes of cellular communications, cellular operators have added cellular services in a variety of new frequency bands. In some cases it is possible to use linear arrays of so-called "wide-band" or "ultra-wideband" radiating elements to provide service in a plurality of frequency bands, but in other cases it is necessary to use different linear arrays or planar arrays of radiating elements to support service in the different frequency bands.

As the number of frequency bands has proliferated, increased sectorization has become more common (e.g., dividing a cell into six, nine or even twelve sectors), and the number of base station antennas deployed at a typical base station has increased significantly. However, due to local zoning ordinances and/or weight and wind loading constraints for the antenna towers, etc. there is often a limit as to the number of base station antennas that can be deployed at a given base station. In order to increase capacity without further increasing the number of base station antennas, so-called multi-band antennas have been introduced in which a plurality of linear arrays of radiating elements are included in a single antenna. One very common multi-band antenna includes a linear array of "low-band" radiating elements that are used to provide service in some or all of the 617 to 960 MHz frequency band, and a linear array of "mid-band" radiating elements that are used to provide service in some or all of the 1,427 to 2,690 MHz frequency band. These linear arrays of low-band and mid-band radiating elements are typically mounted in a side-by-side fashion.

However, in multi-band antennas, radiating elements in different frequency bands interfere with each other. For example, low-band radiating elements may produce relatively large scattering effects on the mid-band radiating elements and/or high-band radiating elements in the rear region, thereby affecting the performance, such as the beam width and the like of the antenna beams generated by the mid-band radiating elements and/or high-band radiating elements.

To avoid the above scattering effects, a choke may be introduced on the dipole arm of the low-band radiating element, thereby inhibiting the mid-band current and/or high-band current from being excited on the dipole arm. However, with the choke, the radiation performance of the low-band radiating elements per se may be negatively affected. In some cases, the choke may undesirably increase the impedance of the low-band radiating elements, making impedance matching difficult, thereby causing return loss to deteriorate. Further, the choke may undesirably increase the radiation loss of the low-band radiating elements, causing the gain of the array to decrease.

SUMMARY

Therefore, the objective of the present disclosure is to provide a radiating element and a base station antenna capable of overcoming at least one drawback in the prior art.

According to a first aspect of the present disclosure, a radiating element is provided, including: a dipole arm, configured to emit first electromagnetic radiation within a pre-determined first operating frequency band; and a parasitic radiator, configured such that a first induced current induced on the parasitic radiator within a second operating frequency band at least partially cancels a second induced current induced on the dipole arm within the second operating frequency band.

According to a second aspect of the present disclosure, a radiating element is provided, including: a dipole arm, configured to emit first electromagnetic radiation within a first operating frequency band; and a parasitic radiator, configured to have electromagnetic effects with the dipole arm, such that the cloaking performance of the radiating element to electromagnetic radiation within a second operating frequency band outside of a first operating frequency band meets the pre-determined design parameters.

According to a third aspect of the present disclosure, a radiating element is provided, including: a dipole arm, configured to emit first electromagnetic radiation within a first operating frequency band; and a parasitic radiator arranged adjacent to the dipole arm, a resonant frequency of the parasitic radiator being within a second operating frequency band higher than the first operating frequency band.

According to a fourth aspect of the present disclosure, a base station antenna is provided, including: a first radiating element array configured to emit first electromagnetic radiation within a pre-determined first operating frequency band, in which, at least a part of first radiating elements in the first radiating element array is constructed as radiating elements according to any one of the embodiments of present application; and a second radiating element array, configured to emit second electromagnetic radiation within a pre-determined second operating frequency band.

BRIEF DESCRIPTION OF THE DRAWINGS

The present disclosure will be explained in greater detail by means of specific embodiments with reference to the attached drawings. The schematic drawings are briefly described as follows.

DETAILED DESCRIPTION

Figure 1:
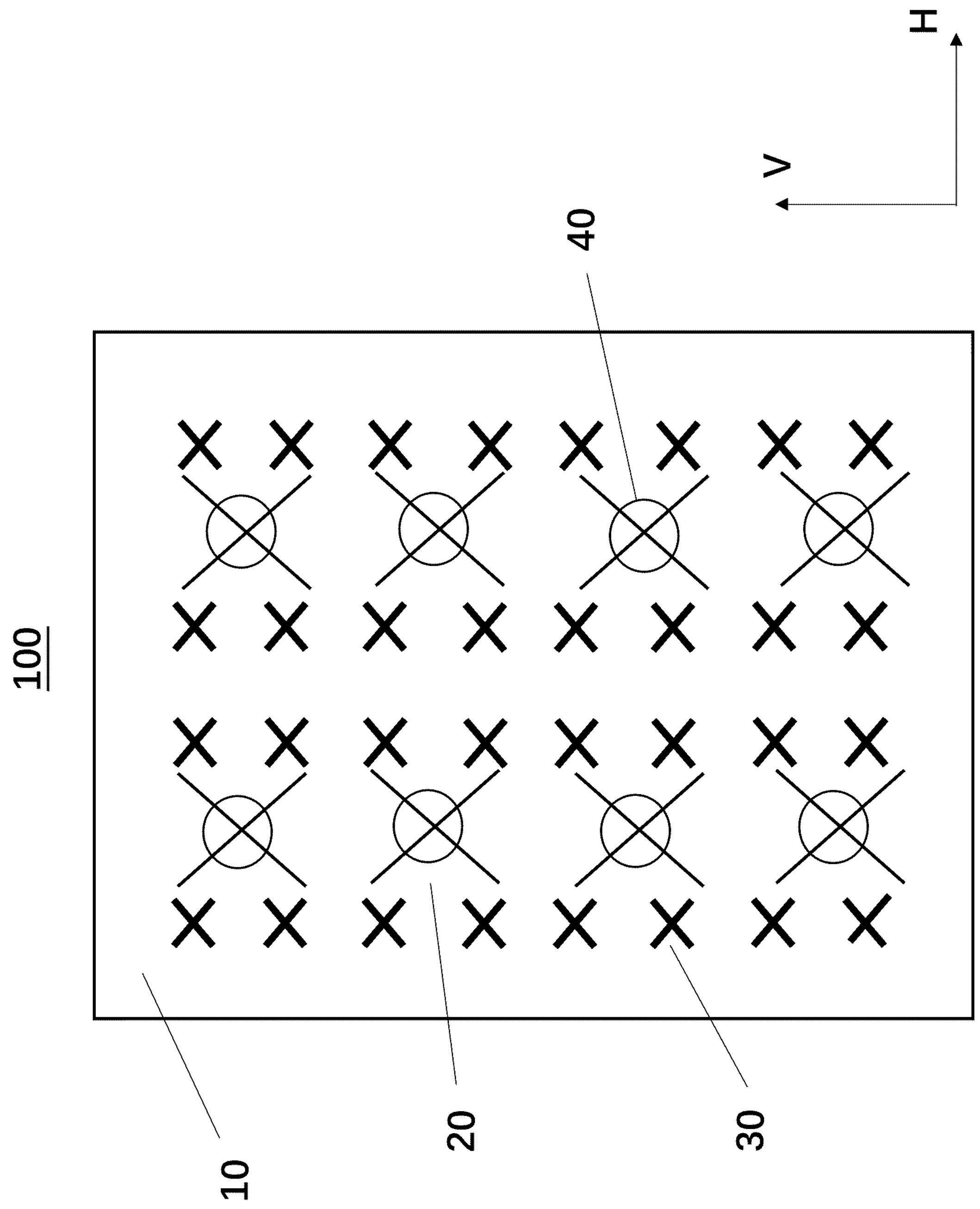
FIG. 1 is a schematic front view of a base station antenna according to some embodiments of the present disclosure, in which a radome is removed.

The present disclosure will be described below with reference to the attached drawings, wherein the attached drawings illustrate certain embodiments of the present disclosure. However, it should be understood that the present disclosure may be presented in many different ways and is not limited to the embodiments described below; in fact, the embodiments described below are intended to make the disclosure of the present disclosure more complete and to explain more fully the protection scope of the present disclosure to those of ordinary skill in the art. It should also be understood that the embodiments disclosed in the present disclosure may be combined in various ways so as to provide more additional embodiments.

It should be understood that the terms used herein are only used to describe specific embodiments, and are not intended to limit the scope of the present disclosure. All terms used herein (including technical terms and scientific terms) have meanings normally understood by those skilled in the art unless otherwise defined. For brevity and/or clarity, well-known functions or structures may not be further described in detail.

As used herein, spatial relationship terms such as "upper," "lower," "left," "right," "front," "back," "high," and "low" can explain the relationship between one feature and another in the attached drawings. It should be understood that, in addition to the orientations shown in the attached drawings, the terms expressing spatial relations also comprise different orientations of a device in use or operation. For example, when a device in the attached drawings rotates reversely, the features originally described as being "below" other features now can be described as being "above" the other features." The device may also be oriented by other means (rotated by 90 degrees or at other locations), and at this time, a relative spatial relation will be explained accordingly.

As used herein, the term "A or B" comprises "A and B" and "A or B," not exclusively "A" or "B," unless otherwise specified.

As used herein, the term "schematic" or "exemplary" means "serving as an example, instance or explanation," not as a "model" to be accurately copied." Any realization method described exemplarily herein may not be necessarily interpreted as being preferable or advantageous over other realization methods. Furthermore, the present disclosure is not limited by any expressed or implied theory given in the above technical field, background art, summary of the invention or embodiments.

As used herein, the word "basically" means including any minor changes caused by design or manufacturing defects, device or component tolerances, environmental influences, and/or other factors.

As used herein, the term "partially" may be a part of any proportion. For example, it may be greater than 10%, 20%, 30%, 40%, 50%, 60%, 70%, 80%, 90%, or may even be 100%, i.e. all.

In addition, for reference purposes only, "first," "second" and similar terms may also be used herein, and thus are not intended to be limitative. For example, unless the context clearly indicates, the words "first," "second" and other such numerical words involving structures or elements do not imply a sequence or order.

The present disclosure relates to a radiating element, which may include a dipole and a parasitic radiator. The dipole arm of the dipole and parasitic radiator may have electromagnetic effects on each other, such that the cloaking performance of the radiating element meets pre-determined design requirements. Cloaking performance of the radiating element may be understood as partial or complete transparency or otherwise invisibility of the radiating element to electromagnetic radiation within an operating frequency band (hereinafter referred to as a second operating frequency band) that is outside of the operating frequency band (hereinafter referred to as a first operating frequency band) thereof, such that the electromagnetic radiation within the second operating frequency band may be basically unaffected by the radiating elements and radiate forwardly in a low distortion manner. In other words, cloaking performance of the radiating element may be understood as the inhibitory effect or attenuation effect of the radiating element on the excitation current in the second operating frequency band, such that the radiating element is basically unable to outwardly radiate scattered electromagnetic radiation in the second operating frequency band.

Embodiments of the present disclosure will now be described in greater detail with reference to the attached drawings.

Referring to FIG. 1, FIG. 1 is a schematic front view of a base station antenna 100 according to some embodiments of the present disclosure, in which a radome is removed.

The base station antenna 100 may be mounted on an elevated structure, for example, an antenna tower, a telegraph pole, a building, or a water tower, such that the longitudinal axis thereof extends substantially perpendicular to the ground.

The base station antenna 100 is usually mounted in a radome (not shown) that provides environmental protection. The base station antenna 100 may include a reflector 10, which may include a metal surface that provides a ground plane and reflects electromagnetic waves reaching the reflector, for example, electromagnetic waves are redirected to propagate forwardly.

The base station antenna 100 may include a radiating element array arranged at the front of the reflector 10. The radiating element array may include a plurality of columns of radiating elements arranged in a longitudinal direction V. The longitudinal direction V may be the direction of the longitudinal axis of the base station antenna 100 or may be parallel to the longitudinal axis. The longitudinal direction V is perpendicular to a horizontal direction H and a forward direction F. Each radiating element is mounted to extend forwardly (along the forward direction F, refer to FIG. 2) from the reflector 10.

The base station antenna 100 may be a multi-band antenna. The term "multi-band antenna" refers to an antenna having two or more arrays of radiating elements operating in different frequency bands. Multi-band antennas include dual-band antennas and antennas that support service in three or more frequency bands. In the illustrated embodiment, the base station antenna 100 may include a plurality of columns of first radiating elements 20 and a plurality of columns of second radiating elements 30 arranged at the front of the reflector 10. An operating frequency band of the first radiating element 20 may be, for example, 617 to 960 MHz or a sub-band thereof. An operating frequency band of the second radiating element 30 may be, for example, 1,427 to 2,690 MHz or a sub-band thereof. In other words, the first radiating element 20 may be configured as a low-band radiating element that is capable of operating within the pre-determined first operating frequency band and emit first electromagnetic radiation within the first operating frequency band. The second radiating element 30 may be configured as a mid-band radiating element to operate within the pre-determined second operating frequency band and emit second electromagnetic radiation within the second operating frequency band. The first radiating element 20 may extend forwardly from the reflector 10 farther than the second radiating element 30.

Depending on how the first radiating element 20 is fed, each column of first radiating elements 20 may be configured to form a plurality of separate first antenna beams (for each polarization) within the first operating frequency band, or may be configured to form a single antenna beam (for each polarization) within the first operating frequency band. Depending on how the second radiating element 30 is fed, each column of second radiating elements 30 may be configured to form a plurality of separate second antenna beams (for each polarization) within the second operating frequency band, or may be configured to form a single second antenna beam (for each polarization) within the second operating frequency band.

It should be understood that the base station antenna 100 may further include a plurality of columns of third radiating elements (not shown) arranged at the front of the reflector 10. Each third radiating element may be constructed as a high-band radiating element, and the operating frequency band thereof may be, for example, 3.1 to 4.2 GHz or the sub-band thereof.

The first radiating element 20 according to some embodiments of the present disclosure may be a low-frequency radiating element, that is, the above first radiating element 20 may be implemented using the radiating elements according to embodiments of the present invention. In other embodiments, the first radiating element 20 according to some embodiments of the present disclosure may also be a wideband radiating element, and the operating frequency band thereof may not be limited to the first operating frequency band.

Figure 2:
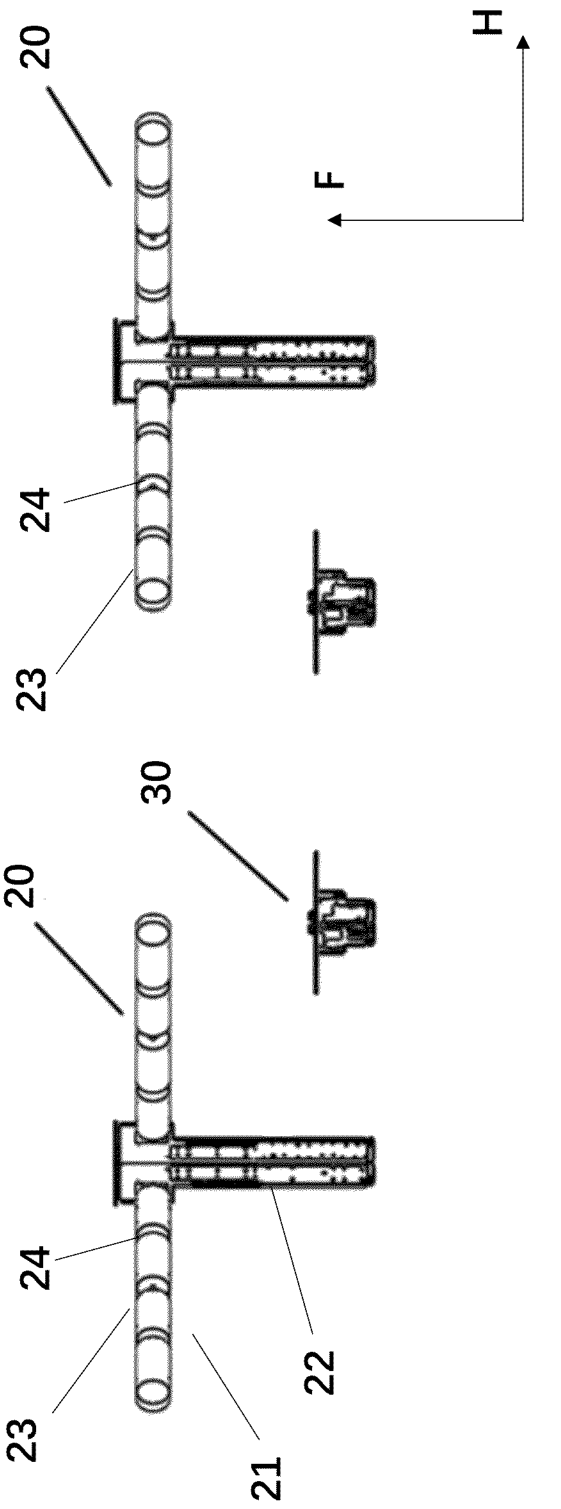
FIG. 2 is a partial view of the base station antenna in FIG. 1, showing an example of an arrangement of low-band radiating elements and mid-band radiating elements.

Cloaking performance of the first radiating element 20 will be exemplarily explained with reference to FIG. 2. In the illustrated embodiment, the first radiating element 20 may be constructed as a rod-shaped dipole radiating element, which may include a cross dipole 21 and a feeder pillar 22 that feeds the cross dipole 21. Each dipole 21 may include a first dipole arm 23 and a second dipole arm 23. The one or plurality of second radiating elements 30 may be arranged behind the corresponding dipole arm 23 of the first radiating element 20, such that electromagnetic radiation from the second radiating element 30 may be projected onto the first radiating element 20, and the dipole arms 23 of the first radiating element 20 may induce excitation current within the second operating frequency band, thereby causing scattered interference of the first radiating element 20 with the second radiating element 30.

In order to reduce the scattered interference of the first radiating element 20 with the second radiating element 30, a choke 24 may be introduced in the dipole arms 23 of the first radiating element 20 to inhibit the excitation current within the second operating frequency band. The choke 24 may be formed by a gap introduced for interrupting the dipole arm 23. As shown in FIG. 2, the dipole arms 23 of the first radiating element 20 may include a plurality of arm sections connected via one or more chokes 24.

It should be understood that the number and length of each arm section may be adjusted adaptively according to the actual operating frequency of the second radiating element 30, so as to improve the cloaking performance of the first radiating element 20 to the second radiating element 30. However, the impedance of the dipole arms 23 increases with the increase in the number of chokes 24 on the dipole arm 23, making it difficult to match the impedance of the dipole arms 23, thereby causing the return loss performance of the first radiating element 20 per se to deteriorate. In addition, the choke 24 may also undesirably increase the radiation loss of the low-band radiating element such that antenna gain is reduced.

In order to reduce the problem caused by the choke 24, the first radiating element 20 may have a parasitic radiator 40 arranged adjacent to the dipole arms 23. "Adjacent" may be understood as: the spacing between the dipole arms 23 and the parasitic radiator 40 may be designed to be closer than that of a conventional director for widening the frequency band or reducing the height of the feeder pillar 22—the height of the director and the dipole arms 23 may generally be up to one quarter of the wavelength corresponding to the central operating frequency of the low-band radiating element—such that the electromagnetic effects between the dipole arms 23 and the parasitic radiator 40 are efficient. In some embodiments, the parasitic radiator 40 may be mounted in front of the corresponding dipole arm 23. In some embodiments, the corresponding parasitic metal ring may also be mounted behind the corresponding dipole arm 23. In some embodiments, the corresponding parasitic metal ring may also be mounted at the side of the corresponding dipole arm 23. The parasitic radiator 40 may be configured to have electromagnetic effects with the dipole arms 23, such that the cloaking performance of the radiating element meets the pre-determined design requirements. In other words, cloaking performance of the first radiating element 20 may be produced by specific electromagnetic effects between the parasitic radiator 40 and the dipole arms 23.

In some embodiments, cloaking performance of the first radiating element 20 may only be produced by specific electromagnetic effects between the parasitic radiator 40 and the dipole arms 23. In other words, the dipole arms 23 of the first radiating element 20 may be used as non-cloaking dipole arms and no longer have a choke 24, thereby basically eliminating the negative impact caused by the choke 24.

In some embodiments, cloaking performance of the first radiating element 20 may be produced not only by the choke 24 but also by specific electromagnetic effects between the parasitic radiator 40 and the dipole arms 23. In this case, the dipole arms 23 of the first radiating element 20 may have a smaller number of chokes 24. For example, each dipole arm 23 may have fewer than four, three, or two chokes, thereby reducing the negative impact of the choke 24.

Figure 3:
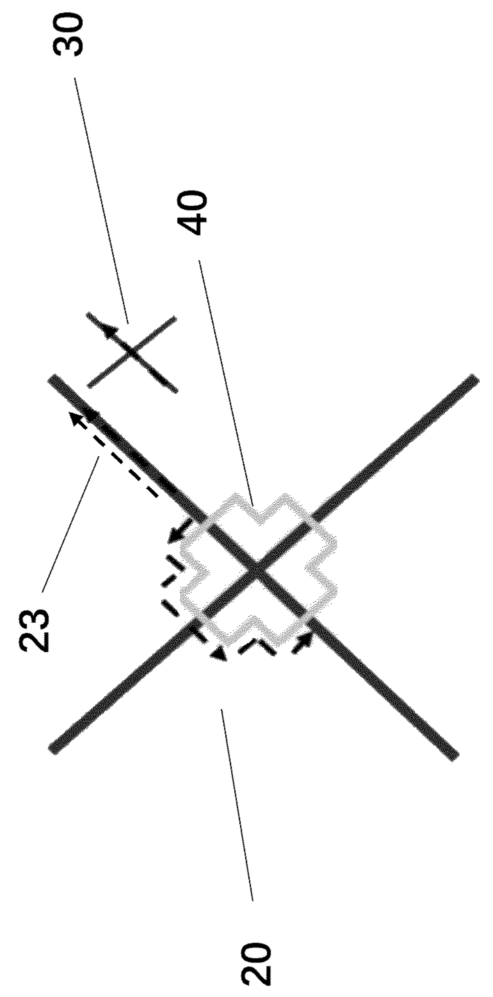
FIG. 3 is a schematic front view of a radiating element according to some embodiments of the present disclosure, so as to explain the cloaking performance of the radiating element.

Next, with reference to FIG. 3, the specific electromagnetic effects between the parasitic radiator 40 and the dipole arms 23 in the first radiating element 20 for achieving the desired cloaking performance of the first radiating element 20 to the second radiating element 30 are schematically explained.

The second radiating element 30 may be configured to emit second electromagnetic radiation within the second operating frequency band. When the second electromagnetic radiation is projected forwardly onto the dipole arms 23 of the first radiating element 20, a second induced current (shown by dashed arrows in the drawings) within the second operating frequency band may be excited on the dipole arms 23. At the same time, a first induced current (shown by dashed arrows in the drawings) within the second operating frequency band may be excited on the parasitic radiator 40. In order to at least partially reduce the scattered interference of the first radiating element 20 with the second radiating element 30, the first induced current induced on the parasitic radiator 40 should at least partially cancel the second induced current induced on the dipole arms 23. To achieve the cancellation, the first induced current induced on the parasitic radiator 40 may be in opposite phase with the second induced current induced on the dipole arms 23 (this may be shown by reverse dashed arrows). In the present disclosure, "cancellation" may be understood as scattered electromagnetic radiation induced by the first induced current may at least partially reduce the scattered electromagnetic radiation induced by the second induced current (e.g. at least 30%, 40%, 50% or 60% reduction), thereby significantly reducing scattered electromagnetic radiation of the first radiating element 20.

In some embodiments, as compared to the input power for the arrays of second radiating elements 30 within the pre-determined second operating frequency band, the first radiating elements 20 of the present disclosure may attenuate the scattered electromagnetic radiation generated by the arrays of first radiating elements 20 within the second operating frequency band by at least 10 dB, 13 dB, 15 dB, 16 dB, or 20 dB by means of electromagnetic effects between the parasitic radiator 40 and the dipole arms 23.

In some embodiments, the first radiating element 20 may have a choke 24, so the choke 24 is already capable of attenuating the scattered electromagnetic radiation within the second operating frequency band to a specific degree, for example, by at least 3 dB, 4 dB, 6 dB, 10 dB, 13 dB, etc. The first radiating elements 20 of the present disclosure may further attenuate the scattered electromagnetic radiation by at least 3 dB, 6 dB or 10 dB, etc. by means of electromagnetic effects between the parasitic radiator 40 and the dipole arms 23.

Additionally or alternatively, the first radiating element 20 of the present disclosure may also improve the radiation pattern of the first radiating element 20 per se by means of electromagnetic effects between the parasitic radiator 40 and the dipole arms 23. In the operating state of the base station antenna 100, the first radiating element 20 may be configured to emit the first electromagnetic radiation within the first operating frequency band, and thus have an operating current within the first operating frequency band on the dipole arms 23 of the first radiating element 20. In some cases, the parasitic radiator 40 may be configured such that a third induced current induced on the parasitic radiator 40 within the first operating frequency band is in phase with the operating current on the dipole arms 23, thereby tuning the radiation pattern of the first radiating element 20.

Cloaking performance of the first radiating element 20 to the second radiating element 30 may be related to the distance of the parasitic radiator 40 relative to the dipole arms 23 and the size parameters of the parasitic radiator 40. The size parameters of the parasitic radiator 40 may include the shape and/or length of the parasitic radiator 40. By adjusting the distance of the parasitic radiator 40 relative to the dipole arms 23 and/or the size parameters of the parasitic radiator 40, the operating characteristics of the parasitic radiator 40, such as the resonant frequency and/or tuning intensity thereof, may be adjusted. The size parameters of the parasitic radiator 40 may be designed such that the resonant frequency of the parasitic radiator 40 is within the second operating frequency band, thereby forming an induced current on the parasitic radiator 40 within the second operating frequency band for eliminating scattered interference.

Additionally or alternatively, the first radiating element 20 may have multi-band cloaking performance or broadband cloaking performance. In some embodiments, the first radiating element 20 may have a first parasitic radiator and a second parasitic radiator. The first parasitic radiator may have a first working frequency band, and the second parasitic radiator may have a second working frequency band that does not completely overlap the first working frequency band. As such, the first radiating element 20 may have cloaking performance to electromagnetic radiation within the first working frequency band and also have cloaking performance to electromagnetic radiation within the second working frequency band. Next, a variety of modified schemes of the parasitic radiator 40 of the radiating element according to some embodiments of the present disclosure will be described in detail with reference to FIGS. 1, 3 and 4A to 4D.

As shown in FIGS. 1, 3, 4A, 4B, and 4C, the parasitic radiator 40 may be constructed as a parasitic metal ring that may be mounted in front of the corresponding dipole arm 23. In other embodiments, the corresponding parasitic metal ring may also be mounted behind the corresponding dipole arm 23. In the embodiment in FIGS. 1 and 4B, the parasitic metal ring may be a circular ring. In the embodiment in FIGS. 3 and 4C, the parasitic metal ring may be a cross-shaped ring. In the embodiment in FIG. 4A, the parasitic metal ring may be a polygonal ring (a quadrilateral ring herein). It should be understood that the parasitic metal ring may be designed in a variety of ways and is not limited to the embodiments in the drawings. In some embodiments, the parasitic metal ring may be a complete closed loop. In some embodiments, the parasitic metal ring may be an open loop having at least one interrupted section. In some embodiments, the parasitic metal ring may also include sections having different shapes and/or different lengths and/or different widths.

The parasitic metal ring may include a first circuit path and a second current path. The first circuit path and the second current path may be a path extending from one end of the parasitic metal ring to an opposite end, respectively. When the parasitic metal ring is a symmetrical ring, the first circuit path and the second current path may be half the circumference of the parasitic metal ring. When the parasitic metal ring is an asymmetric ring, the first circuit path may be longer than the second current path. It should be understood that, the length of the first circuit path and the second current path may be associated with the second operating frequency band. In some embodiments, the length of the first circuit path and the second current path may be basically equal to a half wavelength corresponding to a specific frequency point within the second operating frequency band, for example, the center frequency point. Thus, the circumference of the parasitic metal ring may be substantially equal to one wavelength corresponding to a specific frequency point in the second operating frequency band, for example, a center frequency point. In some embodiments, the length of the first circuit path and the second current path may be basically equal to one quarter of the wavelength corresponding to a specific frequency point within the second operating frequency band, for example, the center frequency point. Thus, the circumference of the parasitic metal ring may be substantially equal to a half wavelength corresponding to a specific frequency point in the second operating frequency band, for example, a center frequency point. As such, the induced current induced on the first circuit path and the second current path may be in opposite phase with the second induced current induced on the corresponding dipole arm 23.

In order to create a symmetric electromagnetic environment, the parasitic metal ring for each radiating element may have an arranged structure of axial symmetry and/or central symmetry. In some embodiments, the parasitic metal ring may be arranged in the middle of the cross dipole 21 (as shown in FIGS. 1, 3, 4A, 4B, and 4C), such that each dipole arm 23 may share one parasitic metal ring. In some embodiments, the radiating element may also have a plurality of parasitic metal rings for each dipole arm 23.

Figure 4D:
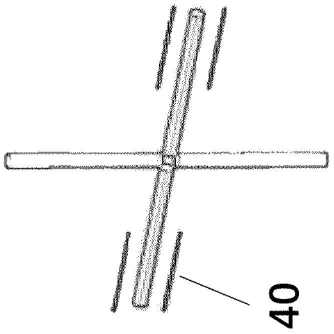
FIGS. 4A, 4B, 4C and 4D are four examples of modified schemes of a parasitic radiator of a radiating element according to some embodiments of the present disclosure.
Figure 4C:
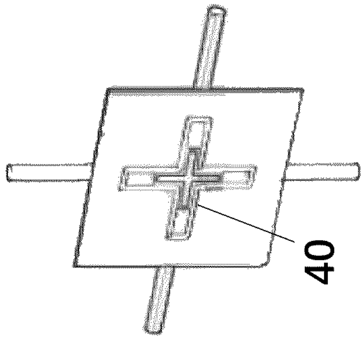
Figure 4B:
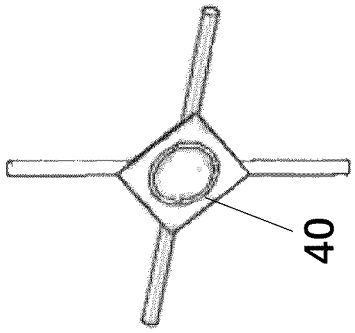
Figure 4A:
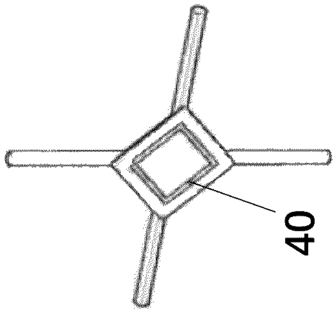

As shown in FIG. 4D, the parasitic radiator 40 may be constructed as a parasitic metal section, which may be mounted at the side of the corresponding dipole arm 23. In the illustrated embodiment, the parasitic metal section may be constructed as a straight line section. It should be understood that parasitic metal sections may be designed in a variety of ways and are not limited to the embodiments in the drawings. In some embodiments, the parasitic metal section may be constructed as an arcuate section or a serpentine section. In some embodiments, the parasitic metal section may be a continuous metal section. In some embodiments, the parasitic metal section may be a metal section having at least one interruption. In some embodiments, the parasitic metal section may further include a plurality of sections having different shapes and/or different lengths and/or different widths.

The length of the circuit path of the parasitic metal section may be associated with the second operating frequency band. In some embodiments, the length of the circuit path of the parasitic metal section may be basically equal to one-quarter or one-half of the wavelength corresponding to a specific frequency point within the second operating frequency band, for example, the center frequency point. As such, the induced current induced on the parasitic metal section may be in opposite phase with the second induced current induced on the corresponding dipole arm 23.

In order to create a symmetric electromagnetic environment, each parasitic metal section for each radiating element may have an arranged structure of axial symmetry and/or central symmetry. In some embodiments, at least two parasitic metal sections (as shown in FIG. 4D) may be arranged symmetrically on both sides of each dipole arm 23. In some embodiments, at least one parasitic metal section may be provided for each radiating element.

It should be understood that the parasitic radiator 40 may be designed into diverse forms. In some embodiments, the parasitic radiator 40 may be constructed as a metamaterial surface of a periodically arranged unit. In some embodiments, the parasitic radiator 40 may be constructed as a patch element.

Figure 8:
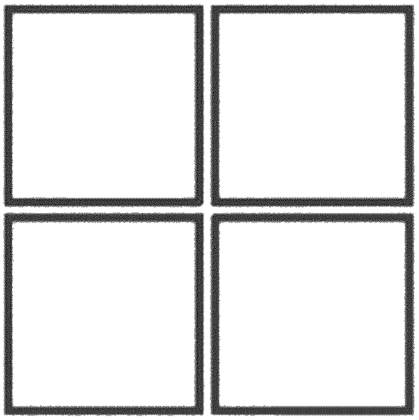
FIG. 8 is a schematic front view of a radiating element according to yet some other embodiments of the present disclosure.
Figure 7:
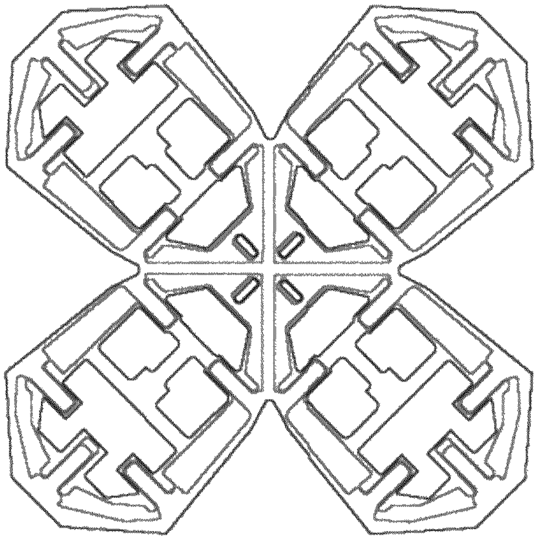
FIG. 7 is a schematic front view of a radiating element according to some other embodiments of the present disclosure.

Next, taking the rod-shaped dipole 21 radiating element as an example, an exemplary assembly method of the parasitic radiator 40 on the radiating element will be introduced. It should be understood that the radiating elements according to the present disclosure may be designed into various forms of radiating elements. In some embodiments, the radiating element may be constructed as a flower-shaped radiating element 20' (as shown in FIG. 7). In some embodiments, the radiating element may be constructed as a square radiating element 20" (as shown in FIG. 8).

Figure 5B:
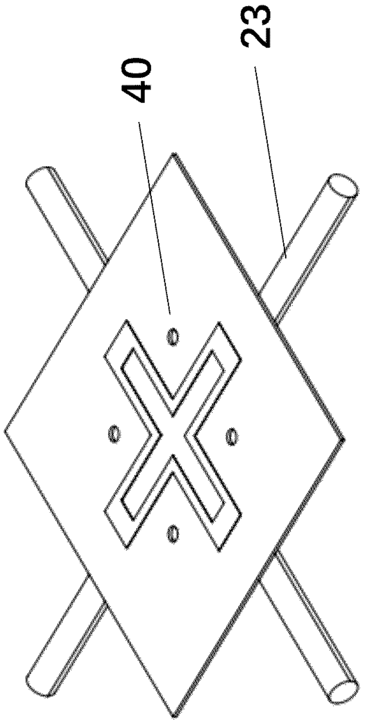
FIG. 5B is a perspective view of the dipole arms and the parasitic radiator in FIG. 5A.
Figure 5C:
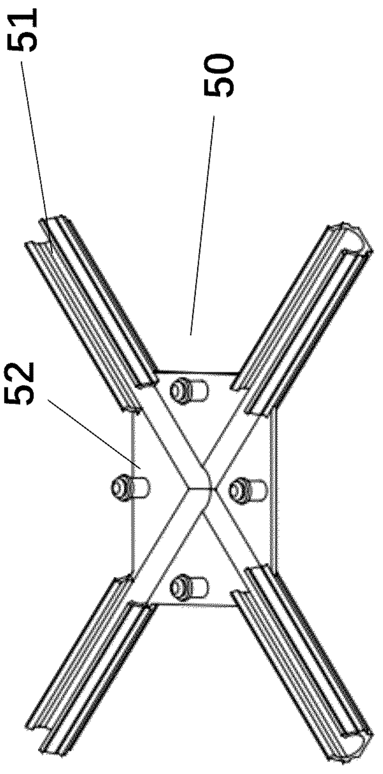
FIG. 5C is a perspective view of the support structure in FIG. 5A.
Figure 5A:
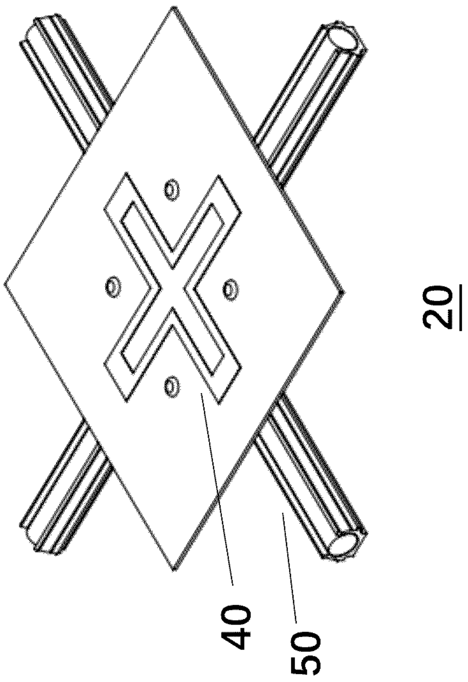
FIG. 5A is an exemplary perspective view of a radiating element according to some embodiments of the present disclosure, in which a feeder pillar is removed.

Referring to FIGS. 5A, 5B and 5C, FIG. 5A is an exemplary perspective view of a radiating element according to a first embodiment of the present disclosure, in which, the feeder pillar 22 is removed. FIG. 5B is a perspective view of the dipole arms 23 and the parasitic radiator 40 in FIG. 5A. FIG. 5C is a perspective view of the support structure 50 in FIG. 5A.

The radiating element may include a feeder pillar 22 (refer to FIG. 2), a cross dipole 21, and a parasitic radiator 40 arranged adjacent to the cross dipole 21. In the illustrated embodiment, the parasitic radiator 40 is exemplarily mounted in front of the cross dipole 21 as a parasitic metal ring.

The parasitic radiator 40 may be implemented as a printed circuit board, and the parasitic metal ring may be printed on the dielectric substrate of the printed circuit board as a metal pattern. In the illustrated embodiment, the parasitic metal ring is printed onto the front surface of the printed circuit board.

It should be understood that the parasitic metal ring may also be printed onto the rear surface of the printed circuit board. In other embodiments, a first metal pattern of the parasitic radiator 40 may be printed on the front surface of the printed circuit board, while a second metal pattern of the parasitic radiator 40 may be printed on the rear surface of the printed circuit board.

It should be understood that the parasitic radiator 40 may also be implemented as a metal element, for example, a copper ring, an aluminum ring, etc.

As shown in FIG. 5C, the radiating element includes a support structure 50, which may include a first support portion 51 for supporting the dipole arms 23 and a second support portion 52 for supporting the parasitic radiator 40. The dipole arms 23 may be fixed on the first support portion 51 by means of a threaded connection, soldering and/or snap-fit connection, and the parasitic radiator 40 may be fixed on the second support portion 52 by means of a threaded connection, soldering and/or snap-fit connection.

It should be understood that the support structure 50 for mounting the parasitic radiator 40 may be diverse and not limited to the present embodiment. In some embodiments, the support structure 50 may also be separately mounted on the feeder panel or reflector 10 such that the parasitic radiator 40 is arranged to be near the dipole arms 23.

Figure 6B:
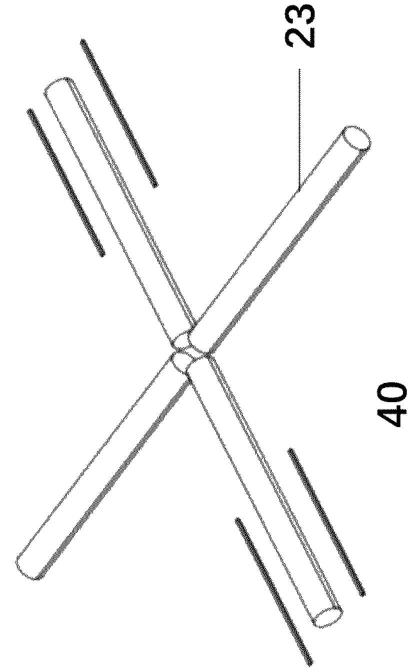
FIG. 6B is a perspective view of the dipole arms and the parasitic radiator in FIG. 6A.
Figure 6C:
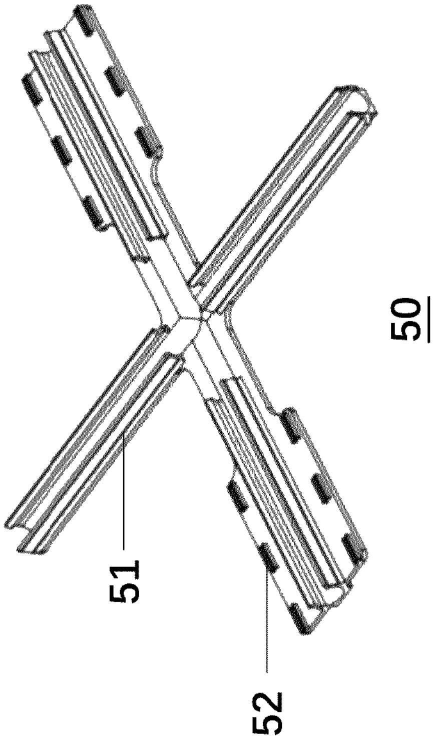
FIG. 6C is a perspective view of the support structure in FIG. 6A.
Figure 6A:
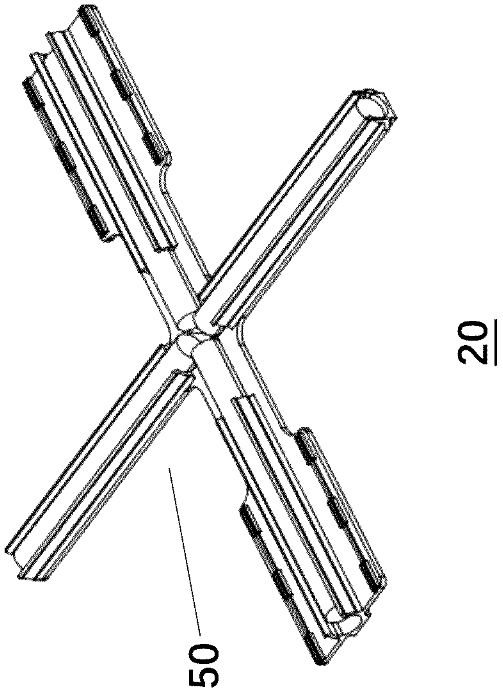
FIG. 6A is an exemplary perspective view of a radiating element according to some embodiments of the present disclosure, in which a feeder pillar is removed.

Referring to FIGS. 6A, 6B and 6C, FIG. 6A is an exemplary perspective view of a radiating element according to a second embodiment of the present disclosure, in which, the feeder pillar 22 is removed. FIG. 6B is a perspective view of the dipole arms 23 and the parasitic radiator 40 in FIG. 6A. FIG. 6C is a perspective view of the support structure 50 in FIG. 6A.

The radiating element may include a feeder pillar 22 (refer to FIG. 2), a cross dipole 21, and a parasitic radiator 40 arranged adjacent to the cross dipole 21. In the illustrated embodiment, the parasitic radiator 40 is exemplarily mounted at the side of the cross dipole 21 as a parasitic metal section.

The parasitic metal section may be implemented as a metal pin, for example, a copper pin, aluminum pin, etc. It should be understood that the parasitic radiator 40 may also be implemented as a printed circuit board, and the parasitic metal section may be printed on the dielectric substrate of the printed circuit board as a metal pattern.

As shown in FIG. 6C, the radiating element includes a support structure 50, which may include a first support portion 51 for supporting the dipole arms 23 and a second support portion 52 for supporting the parasitic radiator 40. The dipole arms 23 may be fixed on the first support portion 51 by means of a threaded connection, soldering and/or snap-fit connection, and the parasitic radiator 40 may be fixed on the second support portion 52 by means of a threaded connection, soldering and/or snap-fit connection.

It should be understood that the support structure 50 for mounting the parasitic radiator 40 may be diverse and not limited to the present embodiment. In some embodiments, the support structure 50 may also be separately mounted on the feeder panel or reflector 10 such that the parasitic radiator 40 is arranged to be near the dipole arms 23.

In view of the above, at least the following are provided:

In some embodiments, a radiating element is provided, the radiating element including: a dipole arm, configured to emit first electromagnetic radiation within a pre-determined first operating frequency band; and a parasitic radiator, configured such that a first induced current induced on the parasitic radiator within a second operating frequency band at least partially cancels a second induced current induced on the dipole arm within the second operating frequency band.

In some embodiments, the first induced current induced on the parasitic radiator basically cancels the second induced current induced on the dipole arm. In some embodiments, the first induced current is in opposite phase with the second induced current. In some embodiments, the first operating frequency band includes at least a part of the 617 to 960 MHz frequency band and the second operating frequency band includes at least a part of the 1,427 to 2,690 MHz frequency band.

In some embodiments, the parasitic radiator is configured such that a third induced current induced on the parasitic radiator within the first operating frequency band is in phase with the operating current on the dipole arm within the first operating frequency band.

In some embodiments, the dipole arm includes a choke, which is configured to inhibit the second induced current induced on the dipole arm. In some embodiments, the choke is constructed to allow operating current on the dipole arm within the first operating frequency band to pass through, while stopping the second induced current induced on the dipole arm. In some embodiments, each dipole arm has fewer than two chokes. Each dipole arm may not have a choke.

In some embodiments, the parasitic radiator is configured to have electromagnetic effects with the dipole arm, such that scattered electromagnetic radiation generated by the radiating element within the second operating frequency band is attenuated by at least 13 dB.

In some embodiments, the parasitic radiator is configured to have electromagnetic effects with the dipole arm, such that scattered electromagnetic radiation generated by the radiating element within the second operating frequency band is attenuated by at least 16 dB.

In some embodiments, the parasitic radiator is arranged adjacent to the corresponding dipole arm.

In some embodiments, the parasitic radiator is constructed as a parasitic metal ring.

In some embodiments, the parasitic radiator is constructed as a parasitic metal section.

In some embodiments, cloaking performance of the radiating element to electromagnetic radiation within the second operating frequency band is related to the distance of the parasitic radiator relative to the dipole arm and the size parameters of the parasitic radiator.

In some embodiments, the resonant frequency of the parasitic radiator is within the second operating frequency band.

In some embodiments, a radiating element is provided, the radiating element including a dipole arm, configured to emit first electromagnetic radiation within a first operating frequency band; and a parasitic radiator, configured to have electromagnetic effects with the dipole arm, such that the cloaking performance of the radiating element to electromagnetic radiation within a second operating frequency band outside of a first operating frequency band meets the pre-determined design parameters.

In some embodiments, the parasitic radiator is configured to have electromagnetic effects with the dipole arm, such that scattered electromagnetic radiation generated by the radiating element within the second operating frequency band is attenuated by at least 13 dB.

In some embodiments, the parasitic radiator is configured to have electromagnetic effects with the dipole arm, such that scattered electromagnetic radiation generated by the radiating element within the second operating frequency band is attenuated by at least 16 dB.

In some embodiments, the parasitic radiator is configured to have electromagnetic effects with the dipole arm, such that scattered electromagnetic radiation generated by the radiating element within the second operating frequency band is attenuated by at least 20 dB.

In some embodiments, a first induced current induced on the parasitic radiator within the second operating frequency band at least partially cancels a second induced current induced on the dipole arm within the second operating frequency band.

In some embodiments, the first induced current is in opposite phase with the second induced current.

In some embodiments, the parasitic radiator is constructed as a parasitic metal ring or parasitic metal section.

In some embodiments, cloaking performance of the radiating element to electromagnetic radiation within the second operating frequency band is related to the distance of the parasitic radiator relative to the dipole arm and the size parameters of the parasitic radiator.

In some embodiments, the resonant frequency of the parasitic radiator is within the second operating frequency band.

In some embodiments, a radiating element is provided, the radiating element including a dipole arm, configured to emit first electromagnetic radiation within a first operating frequency band; and a parasitic radiator arranged adjacent to the dipole arm, a resonant frequency of the parasitic radiator being within a second operating frequency band higher than the first operating frequency band.

In some embodiments, the parasitic radiator is constructed as a parasitic metal ring.

In some embodiments, the parasitic metal ring includes a first circuit path and a second current path.

In some embodiments, the length of the first circuit path and the second current path is basically equal to half or one-quarter of the wavelength corresponding to a specific frequency point within the second operating frequency band.

In some embodiments, the parasitic metal ring is constructed as a polygonal ring, cross-shaped ring, or circular ring.

In some embodiments, the parasitic radiator is constructed as a parasitic metal section.

In some embodiments, the parasitic metal section is constructed as a straight line section, arcuate section or a serpentine section.

In some embodiments, the length of the parasitic metal section is basically equal to one-quarter or one-half of the wavelength corresponding to a specific frequency point within the second operating frequency band.

In some embodiments, the parasitic radiator is mounted in front, behind or at the side of the dipole arm.

In some embodiments, the parasitic radiator is constructed as a printed metal pattern, which is printed on a dielectric substrate.

In some embodiments, the parasitic radiator is constructed as a metal element.

In some embodiments, the radiating element includes a support structure, which includes a first support portion for supporting the dipole arm and a second support portion for supporting the parasitic radiator.

In some embodiments, the dipole arm is fixed on the first support portion by means of a threaded connection, soldering and/or snap-fit connection, and the parasitic radiator is fixed on the second support portion by means of a threaded connection, soldering and/or snap-fit connection.

In some embodiments, the radiating element includes a first parasitic radiator and a second parasitic radiator with different operating frequency bands for achieving multi-band cloaking performance or broadband cloaking performance of the radiating element.

In some embodiments, a base station antenna is provided, the base station antenna including: a first radiating element array configured to emit first electromagnetic radiation within a pre-determined first operating frequency band, in which, at least a part of first radiating elements in the first radiating element array is constructed as radiating elements according to any of the above-provided embodiments; and a second radiating element array, configured to emit second electromagnetic radiation within a pre-determined second operating frequency band.

Although exemplary embodiments of the present disclosure have been described, those skilled in the art should understand that many variations and modifications are possible in the exemplary embodiments without materially departing from the spirit and scope of the present disclosure. Therefore, all variations and changes are included in the protection scope of the present disclosure defined by the claims. The present disclosure is defined by the attached claims, and equivalents of these claims are also included.

The invention claimed is:

1. A base station antenna, comprising:
- a first array of first radiating elements, the first array configured to operate in a first frequency range; and
- a second array of second radiating elements, the second array configured to operate in a second frequency range that is different than the first frequency range and that does not encompass any of the same frequencies as the first frequency range,
- wherein at least some of the first radiating elements comprise:
  - a dipole arm; and
  - a parasitic radiator that overlaps the dipole arm when the base station antenna is viewed from the front, the parasitic radiator configured such that a first induced current induced on the parasitic radiator within the second frequency range at least partially cancels a second induced current induced on the dipole arm within the second frequency range, wherein a resonant frequency of the parasitic radiator is within the second frequency range.

2. The base station antenna of claim 1, wherein the first induced current induced on the parasitic radiator completely cancels the second induced current induced on the dipole arm.

3. The base station antenna of claim 1, wherein the first induced current is in opposite phase with the second induced current.

4. The base station antenna of claim 1, wherein the first frequency range includes at least a part of the 617 to 960 MHz frequency band and the second frequency range includes at least a part of the 1,427 to 2,690 MHz frequency range.

5. The base station antenna of claim 1, wherein the parasitic radiator is configured such that a third induced current induced on the parasitic radiator within the first frequency range is in phase with the operating current on the dipole arm within the first frequency range.

6. The base station antenna of claim 1, wherein the dipole arm includes a choke, which is configured to inhibit the second induced current induced on the dipole arm.

7. The base station antenna of claim 6, wherein the choke is constructed to allow current on the dipole arm within the first frequency range to pass through, while stopping the second induced current induced on the dipole arm.

8. The base station antenna of claim 6, wherein at least one of the first radiating elements further comprises a second dipole arm, and wherein each dipole arm has one choke.

9. The base station antenna of claim 1, wherein at least one of the first radiating elements further comprises a second dipole arm, and wherein neither the first dipole arm nor the second dipole arm has a choke.

10. The base station antenna of claim 1, wherein the parasitic radiator is configured to have electromagnetic effects with the dipole arm, such that scattered electromagnetic radiation generated by a first of the first radiating elements within the second frequency range is attenuated by at least 13 dB.

11. The base station antenna of claim 10, wherein the scattered electromagnetic radiation generated by the first of the first radiating elements within the second frequency range is attenuated by at least 16 dB.

12. The base station antenna of claim 1, wherein the parasitic radiator is adjacent the dipole arm.

13. The base station antenna of claim 1, wherein the parasitic radiator is constructed as a parasitic metal ring.

14. The base station antenna of claim 1, wherein the parasitic radiator is constructed as a parasitic metal section.

15. The base station antenna of claim 1, wherein a cloaking performance of the at least some of the first radiating elements to electromagnetic radiation within the second operating frequency band is related to a distance of the parasitic radiator relative to the dipole arm and size parameters of the parasitic radiator.

16. A base station antenna, comprising:

a first array of first radiating elements, the first array configured to operate in at least a portion of the 617-960 MHz frequency band; and a second array of second radiating elements, the second array configured to operate in at least a portion of the 1427-2690 MHz frequency band, wherein at least one of the first radiating elements comprises:

a dipole arm; and a parasitic radiator configured such that a first induced current induced on the parasitic radiator within the 1427-2690 MHz frequency band at least partially cancels a second induced current induced on the dipole arm within the 1427-2690 MHz frequency band, wherein a resonant frequency of the parasitic radiator is within the 1427-2690 MHz frequency band.

17. The base station antenna of claim 16, wherein the parasitic radiator overlaps the dipole arm when the base station antenna is viewed from the front.

* * * * *